United States Patent Office 3,122,027
Patented Feb. 25, 1964

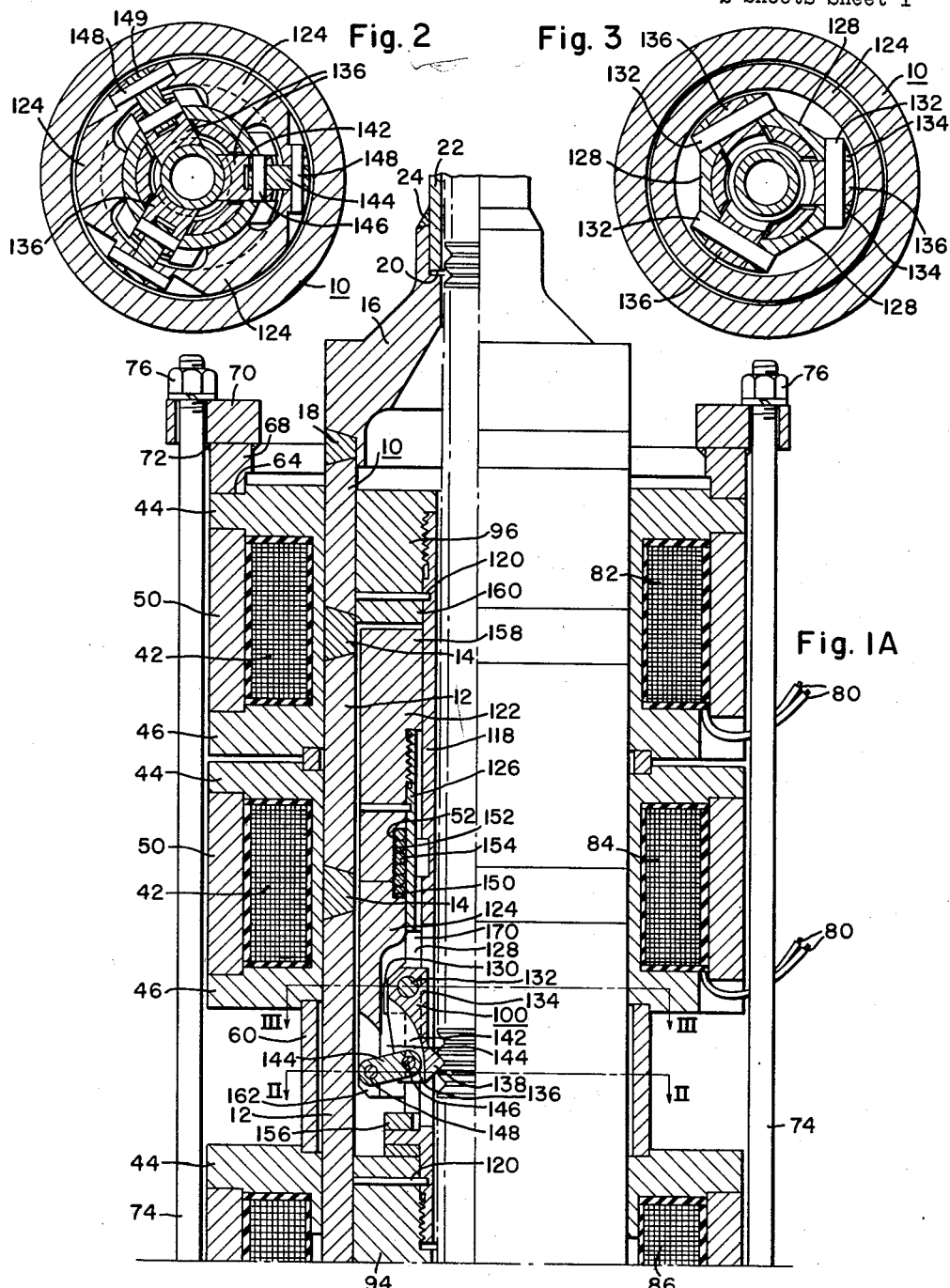

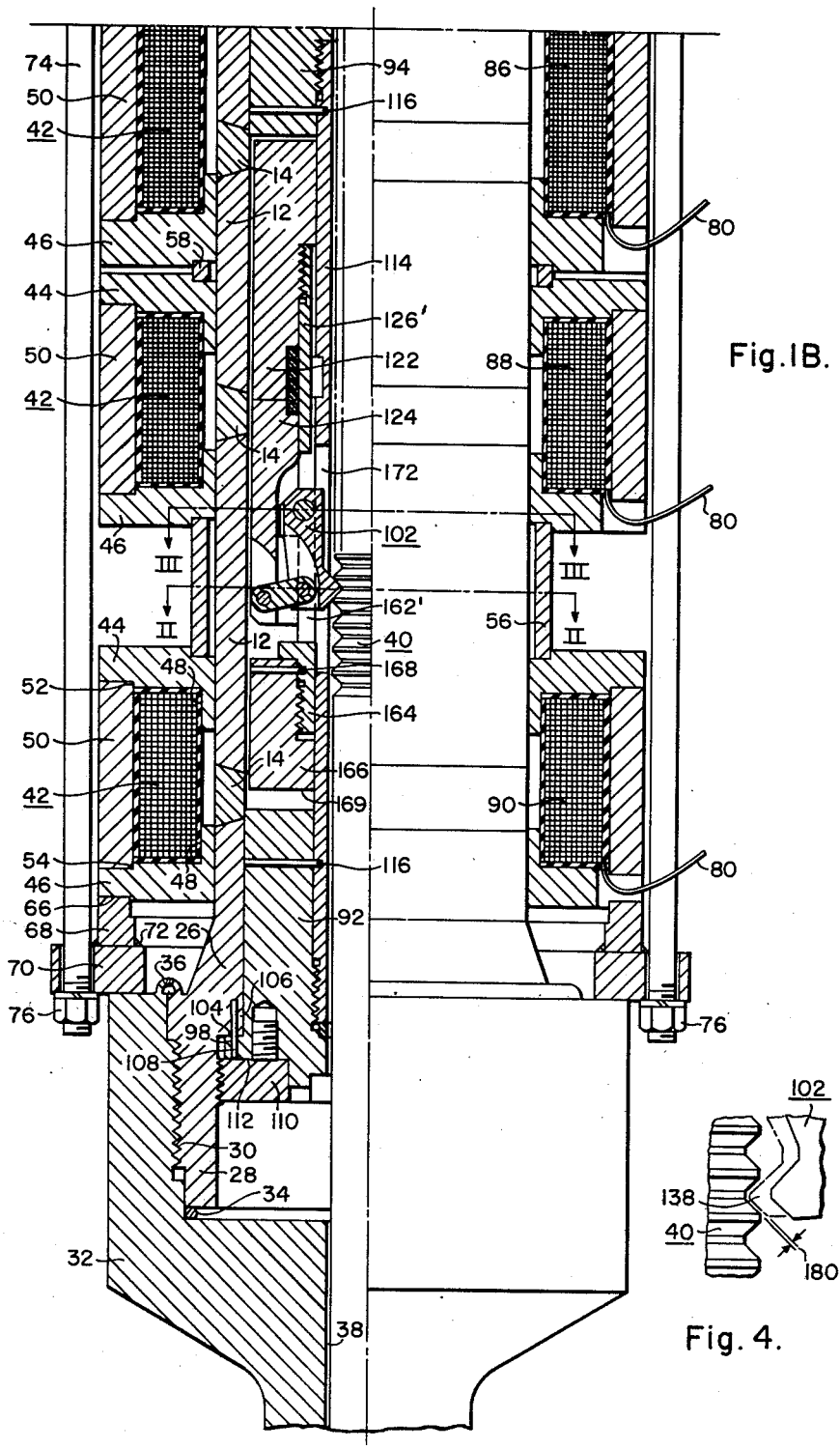

3,122,027
LINEAR MOTION DEVICE
Erling Frisch, Pittsburgh, and Thomas F. Widmer, Monroeville, Pa., assignors, by mesne assignments, to the United States of America as represented by the United States Atomic Energy Commission
Filed Apr. 4, 1960, Ser. No. 19,796
8 Claims. (Cl. 74—128)

The present invention is directed to linear motion devices and more particularly to such devices having gripper arms thereon for rectilinearly moving an element in a step by step manner.

The present linear motion device is particularly adapted to move various elements in a linear direction to any desired position, such as the elements used in controlling a complex chemical process or to operate various elements of a complex machine tool. The elements to be positioned may be located within a sealed pressure vessel which requires some type of seal where the linear motion device enters the sealed pressure vessel.

Previous linear motion devices have used rotary motors and converted the rotary motion to linear motion by various means, as linear motors, or a plurality of solenoids to continuously move an armature in a linear direction. Still other devices have utilized latching or gripping members which are actuated by suitable actuating means to engage or disengage the element to be moved. The gripper when in its engaged position is moved a small increment in the direction of the desired linear motion at which point the element is engaged by holding means. The gripper is then decoupled from the element and returned to its initial position whence it is again coupled to the element. At that time the holding means for the element is decoupled therefrom and the gripping means and the element are moved an additional increment in the desired linear direction. With such systems of the prior art, it is to be noted that the gripper is decoupled from the element while the element still frictionally engages the gripper. Such continuous frictional engagement between the gripper and the element during the coupling and decoupling portions of its cycle, produces a substantial amount of wear on the grippers. As a result frequent replacement of the grippers is required, thereby limiting the use of such linear motion devices in applications wherein frequent maintenance and repair is impractical.

The present invention overcomes the faults of such prior art devices by including means for removing the load placed on the gripper by the element before the gripper is decoupled therefrom. In addition the present invention includes means for disposing the element relative to the gripper so that frictional engagement of the gripper and the linear element during the coupling portion of its cycle does not occur. With these innovations it can be appreciated that excessive wear of the gripper is eliminated with the resulting mechanisms having substantial long life operation.

Accordingly an object of the present invention is to provide a novel and efficient linear motion device.

Another object of this invention is to provide a new and improved linear motion device for rectilinearly moving an element with a gripper wherein wear on the gripper is reduced substantially.

Still another object of this invention is to provide a novel gripper structure for a linear motion device.

A further object of this invention is to provide a linear motion device having a pair of gripper members and having means for transferring the load from one gripper member to the other.

These and other objects and advantages of the instant invention will become more readily apparent upon consideration of the following detailed description of an illustrative embodiment of this invention wherein:

FIGS. 1A and 1B when placed end to end comprise a side elevation view taken partially in section of a linear motion device incorporating the features of this invention;

FIG. 2 is a sectional view of the linear motion device illustrated in FIG. 1 and taken substantially along the line II—II thereof;

FIG. 3 is a sectional view of the linear motion device illustrated in FIG. 1 and taken substantially along the line III—III thereof; and, FIG. 4 is an enlarged detail view of the linearly movable element and its associated gripper member of FIGS. 1 through 3 illustrating in elevation one relative position of these components.

For purposes of describing the instant invention, it will be noted that the gripper members of the linear motion device may be located in three relative positions, with respect to the linear element which is moved thereby. One of the aforesaid relative positions will be defined as the "unlatched" position wherein the gripper is not in position for engagement with the linearly movable element. A second relative position is defined as the "latched" position wherein the gripper element is engaged with the linearly movable element and wherein the gripper is subjected to the load of the linearly movable element. The third relative position of the components is defined as the "coupled" position wherein the gripper is located in its engaged position relative to the linearly movable element but the gripper is not subjected to the load created thereby. It will, therefore, be understood that the difference between the latched position and the coupled position of the gripper exists not with respect to the radial position of the gripper inasmuch as the radial position of the gripper would be the same, but by virtue of a different axial position of the linearly movable element. In the latched position the linearly movable element is in an axial position wherein the gripper is subjected to the load thereof while in the coupled position the linearly movable element is in an axial position wherein the gripper is not subjected to the load thereof.

In accordance with the invention, a linearly movable element is provided with a plurality of axially spaced indentations or teeth thereon. Two sets of latch members or grippers are provided on the linear motion device which may be actuated to engage and be disengaged from the teeth of the linearly movable element. The gripper members are actuated in a predetermined sequence to move the element in the linear directions in small but consecutive increments. In order to achieve the aforesaid movement it is necessary for the first set of grippers to be in the unlatched position while the second set of grippers is located in the latched position, as defined heretofore. The second gripper set is then actuated to move the linear element one increment. At the completion of such movement, the first gripper set is moved to the coupled position while the second gripper set is still located in the latched position. The first gripper set, which is now in the coupled position, is then actuated to be moved into the latched position whereupon the second gripper set is then changed from the latched position to the coupled position. In this manner the second gripper set is then moved to the unlatched position relative to the linearly movable element. It will be understood that upon movement of the second gripper set from the coupled to the unlatched position, the gripper set was not subjected to the load of the linearly movable element, so that wear on the gripper did not take place. The second or unlatched gripper set is then moved axially relative to the linearly movable element and then the second gripper set is moved to the coupled position. Load transferring means are actuated to move the first or latched gripper set to the coupled position and simultaneously to move the second or coupled gripper set to the latched position. The first gripper set, which is now in the coupled position, is moved to the unlatched position during which movement the first gripper set is not subjected to load. The second gripper set and the linear element are then moved axially in the linear direction for another increment whereupon the cycle as heretofore described is again repeated for additional incremental movement of the linear element.

Referring now specifically to FIGS. 1 through 4 there is illustrated therein a linear motion device suitable for use in a highly pressurized system. Thus a tubular pressure housing 10 is formed of a thickness to withstand system pressure. The housing 10 is preferably formed from a material capable of withstanding the high pressures to which it is subjected such as steel and the like and is formed from a plurality of segments or sections 12 which are joined end to end and secured to one another in the aforesaid relationship by annular welds 14. The welds 14 are formed from a different material from the segments 12 and preferably by means of nonmagnetic weld inserts to prevent an axial magnetic flow path along the housing 10. The housing 10 at its upper end is provided with a tapered end closure 16 which is secured to the upper section 12 of the housing 10 by an annular structural weld 18. An inward shoulder 20 is provided adjacent the outer end of the closure 16 which is adapted to receive a tubular extension member 22 thereon. The extension 22 is secured to the upper closure 16 by suitable means such as an anular weld 24 and is preferably enclosed at its upper end by means of a closure member (not shown) in order to maintain the integrity of the pressurized housing 10. The lower end section 26 of the housing 10 is provided with a radially flared portion 28 adjacent its lower end. The outward surface of the flared portion 28 is preferably threaded at 30 so that the latter is adapted to threadedly engage a generally cup-shaped lower end closure 32. Sealing means such as an O-ring 34 and a seal weld 36 are provided to seal hermetically the lower end of the housing 10. The O-ring 34 is preferably disposed between opposed surfaces of the flared portion 28 and the lower end closure 32 with the O-ring 34 being compressed when the lower end closure 32 is threadedly secured to the flared portion 28. The seal weld 36 may be formed in the manner shown and described in Patent 2,805,789 to E. J. Kreh, Jr. et al. and assigned to Westinghouse Electric Corporation. Thus the seal weld 36 may comprise opposed annular projections formed on the lower end closure 32 and on the lower housing section 26 respectively, with the adjacent surfaces of the projections being welded together.

The lower end closure 36 is provided in addition with an axially disposed central opening 38 therein for receiving the linear element 40 as described hereinafter. It is to be noted, of course, that the lower end of the lower end closure 32 may be provided with means thereon (not shown) for securing the linear motion device to the outer surface of a pressurized vessel and the like in a suitable manner wherein the integrity of the pressurized system is not impaired.

A plurality of annular solenoid coils 42 are mounted in a generally tandem array on the outer surface of the pressure housing 10 with each of the coils 42 being at least partially co-extensive with one of the nonmagnetic weld inserts 14. Means are provided for mounting the solenoid coils 42 in a predetermined axial array and the aforesaid means include upper and lower supporting members 44 and 46 which engage respectively the upper and lower ends of each of the coils 42. Each supporting member 44 and 46 is provided with a shoulder 48 thereon for mounting its associated solenoid coil 42 in spaced relationship with respect to the housing 10. A transition member 50 is disposed to bridge the space respectively adjacent the outward ends of the supporting formed between opposed shoulders 52 and 54 formed members 44 and 46. Spacers 56, 58, 60 and 62 are disposed between adjacent coil supporting members 44 and 46 in order to maintain the axial spacings of the coils 42.

The uppermost supporting member 44 and the lowermost supporting member 46 are each provided with an outwardly facing annular shoulder 64 and 66 respectively which shoulders support and maintain ring members 68 respectively. Each ring member 68 is secured to a tie rod supporting annulus 70 by suitable means such as by welding at 72. The annuli 70 are each provided with aligned axial openings therethrough through which tie rods 74 extend. The tie rods 74 are preferably threaded adjacent the ends thereof so that nuts 76 may be secured to each end of each tie rod 74 for completing the assembly of the solenoid coils 42. If desired, the nuts 76 may be tightened so that the supporting structure for the solenoid coils 42 is maintained under compression. The entire solenoid coil supporting structure is maintained at its axial position relative to the housing 10 by virtue of the bearing engagement of the lower surface of the lower annulus 70 with the upper surface of the lower closure member 32.

In the present example of this invention five solenoid coils 42 are illustrated in FIG. 1 and are mounted on the housing 10. Each of the solenoid coils 42 serves a different purpose as will be described and each coil 42 is provided with a pair of lead wires 80 for connection of the associated solenoid coil with a source of electrical potential for energization of the solenoid coils 42. Referring now to the solenoid coils 42 as they are disposed from the top to the bottom of the housing 10, the upper coil comprises a load transfer coil 82 for transferring the load created by the linear element 40 from one of the grippers 100 or 102 to the other gripper in the manner to be described. The second solenoid coil comprises the upper gripper actuating coil 84 which is operable to move the upper gripper 100 between the coupled and unlatched positions. The third of the solenoid coils 42 comprises a lift coil 86 which operates to raise the lower gripper 102. The fourth of the solenoid coils 42 comprises a lower gripper actuating coil 88 which operates to move the lower gripper 102 between the unlatched and the coupled positions; and the fifth of the solenoid coils 42 comprises a pull-down coil 90 which is operable to lower the gripper 102.

Viewing now the interior of the housing 10 it will be noted that three stationarily mounted annuli 92, 94 and 96 are axially spaced therein adjacent the inner side wall of the housing 10. The lower annulus 92 is provided with an outward circumferential flange 98 which forms a shoulder 104 on the outward surface thereof. The shoulder 104 is received on a complementary shoulder 106 formed on the lower section 26 of housing 10. To prevent relative rotation of the lower annulus 92 and the housing 10, aligned openings are provided in the flange 98 of the annulus 92 and in the lower section 26 of the housing 10. The aligned openings are disposed to receive pins 108 only one of which is shown. A locking ring 110 is provided to be threadedly received by the lower section 26 and is disposed to engage the lower surface 112 of the lower annulus 92 so that relative axial movement of the annulus 92 and the housing 10 is prevented. The center stationary annulus 94 is mounted in position within the housing 10 by means of a lower sleeve 114 which threadedly engages at its ends the lower annulus 92 and the center annulus 94 respectively. Means are provided to prevent relative rotation of the lower sleeve 114 with respect to the lower annulus 92 and the center annulus 94. The last-mentioned means include a plurality of locking pins 116 which are received in aligned openings in the lower annulus 92 and the lower sleeve 114 and also in the center annulus 94 and the lower sleeve 114 respectively. The upper annulus 96 is stationarily mounted within the housing 10 by an upper sleeve 118 which threadedly engages at its ends the center annulus 94 and the upper annulus 96 respectively. Locking pins 120 are provided in the last-mentioned members in order to prevent relative rotation thereof in the same manner as the locking pins 116.

Each of the annuli 92, 94 and 96 are formed from magnetic material and each form a portion of the magnetic path of certain of the solenoid coils 42. The upper end of the lower annulus 92 forms a portion of the magnetic path of the pull-down coil 90 while the lower end of the center annulus 94 forms a portion of the magnetic path of the lift coil 86. The lower end of the upper annulus 96 forms a portion of the magnetic path of the load transfer coil 82.

The upper gripper structure 100 comprises a relatively stationary gripper and is formed by a pair of annular support members 122 and 124. The upper member 122 is provided with a tubular extension 126 threadedly secured to the lower end of the inner periphery thereof. The tubular extension 126 is provided adjacent its lower end with three gripper arm supporting members 128 which are flared outwardly adjacent the lower end thereof as illustrated at 130. Three L-shaped gripper arms 136 are secured pivotally between opposed surfaces of adjacent flared portions 130 of the gripper supporting member 128. To provide such pivotal engagement, a pin 132 is passed through aligned openings in adjacent arms 134 of the flared portion 130 and the gripper arm 136 disposed therebetween. Viewing FIG. 3, it will be noted that each flared portion 130 of the extension 126 is provided in a pair of spaced downwardly and outwardly extending projections 134 which flare outwardly to form the flared portions 130. The adjacent projections 134 are spaced to receive a portion of the adjacent gripper arm 136 therebetween.

The lower gripper arm supporting member 124 is provided with a circumferential recess on the inner surface thereof adjacent the lower end as denoted by the reference character 140, in which recess the flared portion 130 of the gripper arm supporting member 128 and the gripper arms 136 are disposed. Each of the gripper arms 136 is provided with an elongated recess 142 which extends inwardly from the bottom and outward surfaces thereof, in which recess there is pivotally disposed one end of a link member 144. A pin 146 is passed through aligned openings in the gripper arm 136 and the adjacent end of the link member 144 to permit the aforesaid pivotal engagement of the link 144 and gripper arm 136. As seen in FIG. 2, the lower end of the lower supporting member 124 is provided with three axially spaced slots 149 therein, in which slots the other ends of the links 144 are disposed. Pins 148 are passed through aligned openings in the lower end of the lower support member 124 and the other end of the link member 144 to provide pivotal engagement of the link 144 with the lower end of the lower support member 124.

The opposed lower and upper surfaces of the upper and lower supporting members 122 and 124 respectively are disposed in butting relationship. Opposed circular recesses 150 and 152 extend inwardly from the abutting surfaces of the supporting members 124 and 122 respectively and are disposed along the inward sides thereof. Biasing means such as a helical spring 154 is mounted in the opposed recesses 150 and 152 to bias the upper and lower supporting members 122 and 124 apart. It will be noted that the abutting surfaces of the upper and lower support members 122 and 124 are disposed in the magnetic path of the gripper actuating coil 84 so that upon energization of the coil 84 a gap between the abutting surfaces will tend to close against the biasing forces of the spring 154. Upon deenergization of the coil 84 the spring 154 will tend to move the abutting surfaces of the upper and lower supporting members 122 and 124 apart which movement is also enhanced by the gravitational forces on the lower supporting member 124. Upon separation of the abutting surfaces of the upper and lower supporting members 122 and 124 the gripper arms 136 will pivotally move about the pins 132, 146 and 148 to cause the base or teeth 138 of the gripper arm 136 to pivotally move away from the linear element 40 to the position hereinbefore defined as the unlatched position. The downward movement of the lower support member 124 is limited by stopping means disposed in the path of such movement such as the stopping rings located at 156.

The load transfer coil 82 provides a magnetic path through the linear motion device which includes in part the upward end 158 of the upper support member 122 and the lower end 160 of the upper annulus 96. Thus when the load transfer coil is energized the surfaces 158 and 160 are moved into abutting relationship and when the load transfer coil 82 is deenergized the gravitational force exerted on the upper support member 122 moves the surfaces 158 and 160 into spaced relationship. The aforementioned separation of the surfaces 158 and 160 upon deenergization of the load transfer coil 82 is limited by engagement of the lower end 162 of the projections 128 of the gripper arm supporting member 126 with the stopping means 156.

The supporting structure for the lower gripper 102 is substantially the same as that described for the upper gripper 100. Thus there is provided an annular upper gripper supporting member 122 and a lower supporting member of annular configuration designated by the reference character 124. Essentially the only difference in construction of the lower gripper supporting structure from the upper gripper supporting structure is the formation of the gripper arm supporting member for the lower gripper 122. The gripper arm supporting member comprises a tubular collar 126' which is threadedly secured to the inward surface of the upper supporting member 122 for the lower gripper 102. The gripper arm supporting member 126' differs from the gripper arm supporting member 126 only at the lower end thereof. For example, instead of terminating the gripper arm supporting member 126' at the lower end in the manner in which the gripper arm supporting member 126 is terminated, there is secured to the lower end 162' of the gripper arm supporting member 126' a collar member 164 of annular configuration and having a generally L-shaped cross section. The collar member is threaded at the inward axial surface thereof and threadedly engages a pull-down annulus 166 which is non-rotatably secured thereto by pins 168. The pull-down annulus is disposed in a portion of the magnetic circuit of the pull-down coil 90 so that upon energization of the pull-down coil 90 the gap between the lower surface 169 of the annulus 166 and the opposed surface of the lower annulus 92 is closed. When the gap is closed it will be noted that the upper and lower gripper supporting structures 124 and 126 of the gripper 102 also are moved downwardly toward the upper surface of the lower annulus 92.

It will be noted that when the pull-down coil 90 is energized it is necessary to deenergize the lift coil 86. Energization of the lower gripper actuating coil 88 causes the gap between the upper and lower supporting structures 126 and 124 for the lower gripper 102 to move into abutting relationship as illustrated in FIG. 1 wherein the gripper 102 is disposed between the teeth of the linearly movable element 40. Deenergization of the lower gripper actuating coil 88 will cause separation of the upper and lower supporting structures 122 and 124 associated with the lower gripper 102 to cause the lower gripper 102 to move to the unlatched position. It will be noted that the upper and lower sleeves 118 and 114 are provided with openings 170 and 172 therein respectively in alignment with the upper and lower gripper structures 100 and 102 to permit movement of the grippers 100 and 102 therethrough into engagement with the teeth of the linear element 40.

For purposes of illustrating the operation of the load transfer coil of this invention it will be necessary to point out the steps utilized for causing incremental movement of the linear element 40. Movement in the upward direction from the position illustrated in FIG. 1 is achieved as follows. With the load transfer coil 82 energized, the load on the grippers created by the weight of the linear element 40 is placed solely upon the upper gripper 100 with the lower gripper being located in the coupled position as illustrated in FIG. 4. Thus a clearance 180 exists between the teeth of the linear element and the base or tooth 138 of the lower gripper 102. The linear motion device as illustrated in FIG. 1 is positioned where the upper gripper actuating coil 84, the lift coil 86, the lower gripper actuating coil 88 are all energized. The sequence for incrementally moving the linear element 40 in the upward direction comprises deenergizing the lower gripper actuating coil 88 to cause the lower gripper 102 to move from the coupled position to the unlatched position. The lift coil 86 and the pull-down coil 90 are simultaneously deenergized and energized respectively to cause the lower surface 169 of the annulus 166 to move into engagement with the opposed adjacent surface of the lower annulus 92. Such movement of the annulus 166 causes downward movement of the lower gripper 102 to a position wherein the lower gripper 102 may be moved to be coupled to the adjacent lower tooth of the linear element 40. The lower gripper actuating coil 88 is then energized to cause the lower gripper 102 to move from the unlatched position to the coupled position with respect to the adjacent lower tooth of the linear element 40. It will be noted that the lower gripper 102 will now be disposed in the position shown in dotted lines in FIG. 4 wherein frictional engagement of the lower gripper 102 and the linear element 40 has not taken place. The prevention of such frictional engagement of the lower gripper 102 with the linear element 40 is achieved by accurately limiting the amount of downward movement of the lower gripper structure 102 in response to actuation of the pull-down coil 90.

The load transfer coil 82 is then deenergized whereupon the surfaces 158 and 160 are moved apart until such downward movement is prevented by engagement of the lower end 162 of the sleeve 126 of the upper gripper 100 with the stop means 156. The aforesaid downward movement of the upper gripper 100 is accurately limited to an amount wherein the load of the linear element is transferred to the lower gripper 102 to place the lower gripper 102 in the latched position and until the upper gripper 100 is moved downwardly relative to the teeth of the linear element 40 to locate the upper gripper 100 in the coupled position. The upper gripper actuating coil 84 is then deenergized to move the upper gripper 100 from the coupled position to the unlatched position. It will be noted that the latter movement of the upper gripper 100 takes place without frictional engagement of the upper gripper 100 with the teeth of the linear element 40. Upward movement of the linear element 40 is then achieved by energization of the lift coil 86 to cause the gap between the lower surface of the center annulus 94 and the upper surface of the adjacent upper supporting structure 122 to close whereupon the linear element is moved upwardly one increment. The incremental movement of the linear element 40 is limited to a length wherein after completion of such incremental movement, energization of the upper gripper actuating coil 84 will cause the upper gripper 100 to be moved from the unlatched position to the coupled position so that frictional engagement of the upper gripper 100 with the teeth of the linear element 40 during movement of the upper gripper 100 to the coupled position does not occur. Thus the upper gripper actuating coil 84 is energized to move the upper gripper 100 from the unlatched position to the coupled position and the load transfer coil 82 is then energized to move the upper gripper 100 from the coupled position to the latched position and simultaneously to cause the lower gripper 102 to be moved from the latched position to the coupled position. Further incremental movement of the linear element 40 in the upward direction is then achieved by merely repeating the cycle of energization of the solenoid coils 42 as described heretofore.

To effectuate downward incremental movement of the linear element 40 from the position illustrated in FIG. 1 the following sequence is employed. The load transfer coil 82 is deenergized to move the upper gripper 100 from the latched position to the coupled position and simultaneously to cause the lower gripper 102 to be moved from the coupled position to the latched position. The upper gripper actuating coil 84 is deenergized to move the upper gripper 100 from the coupled position to the unlatched position. The lift coil 86 and the pull-down coil 90 are simultaneously deenergized and energized respectively to cause the lower gripper 102 and the linear element 40 to move downwardly one increment. It will be noted that energization of the pull-down coil 90 during downward movement of the linear element 40 need not take place inasmuch as the gravitational forces exerted on the gripper 102 by its supporting structure and by the linear element 40 will effectuate the downward movement of the linear element 40 and the gripper 102.

The upper gripper actuating coil 84 is now energized to cause the upper gripper 100 to move from the unlatched position to the coupled position and the load transfer coil is then energized to cause the upper gripper 100 to move from the coupled position to the latched position and simultaneously to cause the lower gripper 102 to be moved from the latched position to the coupled position. The lower gripper actuating coil 88 is deenergized to cause the lower gripper 102 to be moved from the coupled position to the unlatched position. The lift coil 86 is then energized to move the lower gripper 102 while still in the unlatched position in the upward direction to a position opposite the next successive upper tooth of the linear element 40. The lower gripper actuating coil 88 is then energized to move the lower gripper 102 from the unlatched position to the coupled position and the cycle of energization of the coils is then repeated to effectuate further incremental downward movement of the linear element 40.

It will be noted that on no occasion is one of the grippers 100 or 102 moved directly from the latched position to the unlatched position. By means of the load transfer coil, before any of the grippers 100 or 102 is moved to the unlatched position, such gripper is first moved to the coupled position so that frictional engagement between the last-mentioned gripper and the linear element 40 does not occur.

It is to be noted in addition that in the event it is desired to lower rapidly the linear element 40, it is merely necessary to deenergize both the upper gripper actuating coil 84 and the lower gripper actuating coil 88 simultaneously to move both of the grippers 100 and 102 to the unlatched position. The linear element 40 will then fall freely in the downward direction.

It will be noted in addition that conventional means may be utilized for automatically and sequentially energizing and deenergizing the solenoid coils 42 in the sequences described heretofore. Such means do not form a part of the instant invention and may comprise sequence actuating systems well known in the art such, for example, as a relay system or a rotating drum controller.

A novel and efficient embodiment of this invention has been described in detail. It will be noted that numerous changes may be made in the above-described construction, and different embodiments of this invention may be made without departing from the broad spirit and scope thereof. In this light it is specifically intended that all matter contained in the foregoing description or shown

We claim as our invention:

1. A linear motion device including a linearly movable element, a pair of spaced gripper means being each disposed to be sequentially latched and coupled to said element, means for coupling one of said gripper means to said element when the other gripper means is latched to said element, and load transfer means for moving said other gripper means from the latched position to the coupled position and simultaneously to cause said one gripper means to be moved from the coupled position to the latched position.

2. A linear motion device including a linearly movable element, a pair of spaced gripper means being each disposed to be sequentially latched and coupled to said element, means for coupling one of said gripper means to said element when the other gripper means is latched to said element, load transfer means for moving said one gripper means from the coupled position to the latched position and simultaneously to cause said other gripper means to be moved from the latched position to the coupled position, and actuating means coupled to each of said gripper means for causing sequentially each of said gripper means to be moved to an unlatched position only from said coupled position, whereby wear on said gripper means is reduced.

3. A linear motion device including a linearly movable element, a pair of axially spaced gripper means disposed to be sequentially positioned to be latched and coupled to said element and to be unlatched from said element, means latching one of said gripper means to said element when the other of said gripper means is unlatched from said element, and actuating means coupled to said other gripper means for moving said other gripper means from said unlatched position to said coupled position, whereby frictional engagement of said other gripper means and said element during the aforesaid movement of said other gripper means does not take place.

4. A linear motion device including a linearly movable element, a gripper arm disposed adjacent said element, a pair of axially spaced supporting means for said gripper arm, a link member pivotally coupled to one of said supporting means and to said gripper arm adjacent one end thereof, means pivotally coupling the other end of said gripper arm to the other of said supporting means, means for causing said supporting means to be moved closer together so that said gripper arm is pivotally moved radially into engagement with said element, and said supporting members being movable to be further axially spaced from one another to cause disengagement of said gripper arm and said element.

5. In a linear motion device, the combination comprising a linearly movable element, a pair of spaced gripper means disposed to be sequentially latched and coupled to said element and unlatched from said element, means for coupling one of said gripper means to said element when the other gripper means is latched to said element, load transfer means for moving said other gripper means to the coupled position and simultaneously to cause the one gripper means to be placed in the latched position, actuating means for causing said other gripper means to be moved from said coupled position to said unlatched position, and means for moving said one gripper means and said linear element when said one gripper means is latched to said linear element and when said other gripper means is unlatched from said linear element axially along the path of movement of said element.

6. In a linear motion device, the combination comprising a linearly movable element, a pair of spaced gripper means disposed to be sequentially latched and coupled to said element and unlatched from said element, solenoid means for coupling one of said gripper means to said element when the other gripper means is latched to said element, solenoid load transfer means for moving said other gripper means from the latched position to the coupled position and simultaneously to cause the one gripper means to be moved from the coupled position to the latched position, solenoid actuating means for causing said other gripper means to be moved from said coupled position to the unlatched position, and solenoid means for moving said one gripper means and said linear element when said one gripper means is latched to said linear element and when said other gripper means is unlatched from said linear element axially along the path of movement of said element.

7. In a linear motion device, the combination comprising a linearly movable element, a pair of axially spaced gripper means disposed to be sequentially latched and coupled to said element and to be unlatched from said element, means for coupling one of said gripper means to said element when the other gripper means is latched to said element, first solenoid means coupled to each of said gripper means to cause movement of said gripper means only from one of the positions of being coupled and unlatched to the other of the last mentioned positions, respectively, second solenoid means coupled to said one gripper means and energizable when said gripper means respectively are in the coupled and latched positions to move said gripper means respectively to the other of said latched and coupled positions, and third and fourth solenoid means coupled to said other gripper means for respectively moving said other gripper means axially with respect to said linearly movable element in opposite directions.

8. In a linear motion device the combination comprising a linearly movable element, a pair of axially spaced gripper means each having three positions relative to said element consisting of unlatched, coupled and latched positions, solenoid means for causing the first of said gripper means to move to and from said unlatched and said coupled positions, solenoid means for causing the second of said gripper means to move to and from said unlatched and said coupled positions, solenoid means for moving one of said gripper means axially in one direction, solenoid means for moving the other of said gripper means in the opposite axial direction, and solenoid load transferring means for moving either of said gripper means from the coupled to the latched position and simultaneously causing the other gripper means to be moved from the latched to the coupled position.

References Cited in the file of this patent

UNITED STATES PATENTS

| | | |
|---|---|---|
| 2,618,982 | Mead | Nov. 25, 1952 |
| 2,695,525 | Bulenhoff | Nov. 30, 1954 |
| 2,721,904 | Souter | Oct. 25, 1955 |
| 2,730,903 | Traulman | Jan. 17, 1956 |
| 2,752,546 | Frisch | June 26, 1956 |
| 2,822,698 | Gross | Feb. 11, 1958 |
| 2,827,807 | Meyer | Mar. 25, 1958 |
| 2,829,530 | Holden | Apr. 8, 1958 |
| 2,889,085 | Collins | June 2, 1959 |
| 2,924,981 | Critchlow | Feb. 16, 1960 |
| 2,926,535 | Heselwood | Mar. 1, 1960 |